United States Patent  [11] 3,622,588

| [72] | Inventor | Rudolf G. Griot |
| | | Basel-Stadt, Switzerland |
| [21] | Appl. No. | 813,301 |
| [22] | Filed | Apr. 3, 1969 |
| [45] | Patented | Nov. 23, 1971 |
| [73] | Assignee | Sandoz-Wander, Inc. |
| | | Continuation-in-part of application Ser. No. 725,172, Apr. 29, 1968, now abandoned. This application Apr. 3, 1969, Ser. No. 813,301 |

[54] CERTAIN SUBSTITUTED TERPHENYL-AXYALKYL AMINES AND DERIVATIVES THEREOF
20 Claims, No Drawings

[52] U.S. Cl. ................................................. 260/296,
260/240, 260/294.7, 260/326.5, 260/570.7,
260/590, 260/612, 260/619, 260/999
[51] Int. Cl. ...................................................... C07c 93/06
[50] Field of Search .......................................... 260/296
AE, 326.5 M, 570.7

[56] References Cited
UNITED STATES PATENTS

| 2,739,152 | 3/1956 | Krimmel | 260/295 |
| 3,396,169 | 8/1968 | Lednicer | 260/294.7 |
| 3,462,446 | 8/1969 | DeWald | 260/295 |
| 3,413,298 | 11/1968 | Biel et al. | 260/295 |

*Primary Examiner* — Alan L. Rotman
*Attorneys* — Gerald D. Sharkin, Frederick H. Weinfeldt, Robert S. Honor, Walter F. Jewell and Richard E. Vila ABSTRACT: This invention relates to ω-aminoalkoxy substituted terphenyls and N-oxides thereof useful as hypolipidemics, and to processes for preparation of such compounds involving key intermediates which include, for example: (1) substituted tercyclic-ols; or (2) p-(ω-aminoalkoxy) phenyl derivatives of various compounds which are, for example, cyclosubstituted-2-cyclohexen-1-ols, cyclo-substituted-cyclohexenes or cyclohexen-dienes; or (3) α-(m-terphenyl-4-yloxy) lower aliphatic monocarbocylic acids.

CERTAIN SUBSTITUTED TERPHENYL-AXYALKYL AMINES AND DERIVATIVES THEREOF

This application is a continuation-in-part of my prior copending application Ser. No. 725,172, filed Apr. 29, 1968, now abandoned.

The present invention relates to substituted terphenyls and method of preparing the same.

The substituted terphenyls of the present invention are from the group of:

A. compounds represented by the following structural formula I:

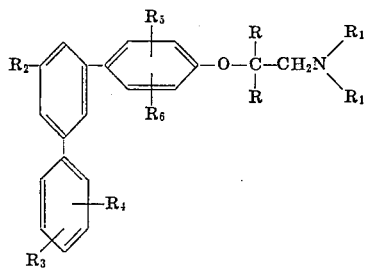

I wherein each of R is, independently, hydrogen or lower alkyl of one to four carbon atoms;

each of $R_1$ is, independently, lower alkyl of one to four carbon atoms or both $R_1$ together an alkylene bridge of four to five carbon atoms, e.g., both $R_1$ together with the amino nitrogen for an N-pyrrolidyl substituent;

$R_2$ is hydrogen, 3-pyridyl, phenyl or substituted phenyl of the formula:

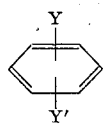

each of Y, Y', $R_3$ and $R_4$ is, independently, hydrogen, halo of atomic weight not exceeding 80, lower alkyl of one to four carbon atoms, lower alkoxy of one to four carbon atoms or phenyl, provided $R_3$ and $R_4$ are hydrogen when $R_2$ is hydrogen and provided $R_3$, $R_4$, Y and Y' together represent no more than one phenyl and providing that $R_3$, $R_4$, Y and Y' together represent no more than a total of two alkyl and alkoxy substituents, and each of $R_5$ and $R_6$ is, independently, hydrogen or lower alkyl of one to four carbon atoms;

B. N-oxides of the compounds formula I, and

C. the pharmaceutically acceptable acid addition salts of (A) and (B), above.

The generally preferred method of preparation of the compounds of the invention involves dehydrogenation with or without dehydration, as required, of any one or more of a class of several compounds which includes, for example, the corresponding p-(ω-aminoalkoxy)phenylcyclo- hexenes, p-(ω-aminoalkoxy)phenyl-cyclohexen-dienes and p-(ω-aminoalkoxy) phenyl-cyclohexen-ols, and representative compounds of this class and their use in preparing the compounds of the invention by dehydrogenation generally referred to herein as the step A reaction is illustrated below, as follows:

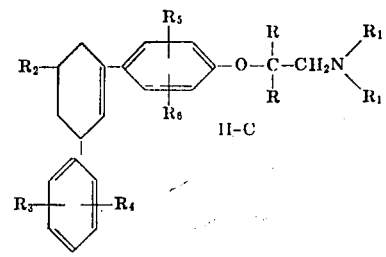
II-A    II-C

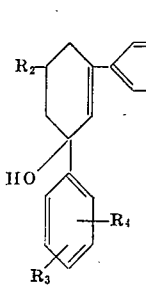
Step A

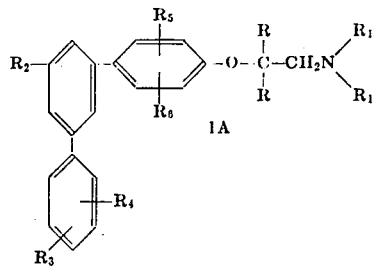
IA

Step A

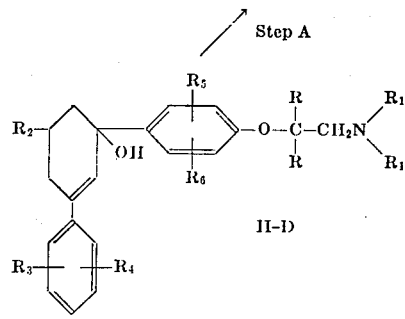
II-D

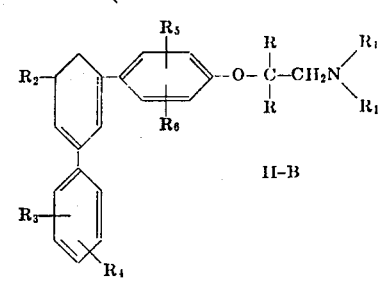
II-B

In the above illustrated reactions the compound IA represented the compounds I of the invention excluding the N-oxides thereof.

The production of compounds IA of the invention from a compound II by step A involves dehydrogenation and in the case of compounds II having a pendent hydroxy group, a dehydration reaction. The dehydration and dehydrogenation may be carried out as separate steps employing known reagents and conditions suitable for the purpose. It is, however, convenient and desirable to react compound II with thionyl chloride whereby dehydrogenation, and dehydration if necessary, are achieved in a single step A. The reaction with thionyl chloride is highly exothermic requiring controlled combination of the reactants and low reaction temperatures, preferably between minus 70° C. to minus 20° C. The reaction is conveniently carried out in an inert solvent medium, preferably a chlorinated hydrocarbon medium. Examples of preferred solvents include methylene chloride, chloroform and carbon tetrachloride, especially methylene chloride.

Another preferred process for preparation of the compounds IA of the invention referred to herein as step A-1 involves reacting a tercyclic-ol or alkali metal salt thereof of the formula II':

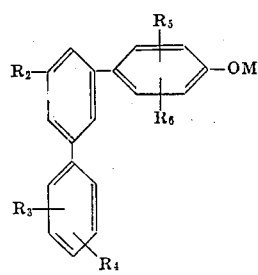

II' wherein $R_2$, $R_3$, $R_4$, $R_5$ and $R_6$ are as defined and M is H or an alkali metal, preferably sodium or potassium, with a compound III which is an alpha halo derivative of or forming the desired ω-aminoalkoxy moiety and having the formula:

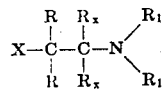

III wherein R and $R_1$ are as defined, X is halo of atomic weight of from 35 to 127 and both $R_x$ are both hydrogen or lower alkyl but when lower alkyl both R are hydrogen, whereby compounds of formula IA of the invention are obtained.

The production of compound IA by the reaction of step A-1 involves a synthesis of the well-known Williamson type and is conveniently carried out by reacting compounds II' and III at elevated temperatures suitably in the range of 30° C. to 150° C. Reflux temperatures are preferably employed and reaction times typically involve a period of from 5 to 40 hours. The reaction is preferably carried out in the presence of an inert organic solvent for the starting materials and product. Examples of such solvents include toluene, dimethylacetamide, dimethylformamide and dimethylsulfoxide, preferably toluene or the solvent in which the alkali metal salt is prepared from the corresponding p-hydroxyphenyl compound. It will be noted that $R_x$ in compound III can be lower alkyl, i.e., the lower alkyl substituent is on the omega carbon atom, because such compounds III are capable of undergoing rearrangement on reaction with compounds II' to form compounds such as compounds IA in which the alpha carbon substituent R is lower alkyl, as described by J. F. Kerwin et al. J.A.C.S. 69, 2961 (1947).

Another preferred process for preparation of the compounds IA of the invention referred to herein as reaction step A-2 involves subjecting a compound of the formula IV:

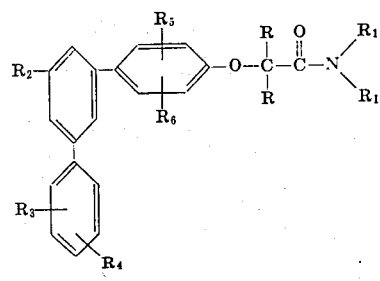

IV wherein R, $R_1$, $R_2$, $R_3$, $R_4$, $R_5$ and $R_6$ are as defined, to reduction in a known manner to obtain said compounds of formula IA.

The reaction of step A-2 is a conventional reduction preferably carried out employing lithium aluminum hydride as reducing agent. Reaction temperatures may be suitably in the range of 20° C. to 150° C. The reaction is carried out in an inert organic solvent of known suitability for such reactions, for example, the ethers such as tetrahydrofuran. The reaction product of formula IA may be isolated by working up by established procedures.

The compounds of formula IV may be obtained by one or more procedures starting from the important intermediate compound of formula II'':

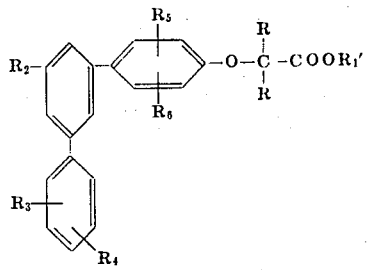

II'' wherein R, $R_2$, $R_3$, $R_4$, $R_5$ and $R_6$ are as defined, and $R_1$ varies depending upon the particular procedure employed. For example, when $B_1'$ is hydrogen, the resulting compound II'' may be subjected in a step A-2-1 to reaction in a known manner to obtain the corresponding acid halide which is then subjected in a step A-2-2 to reaction in a known manner with an amine of the formula V:

V wherein $R_1$ is as defined, to obtain a compound of the formula IV.

The reaction step A-2-1 is a conventional reaction carried out to obtain the acid halide of compound II'' for reaction in step A-2-2 to obtain the compound IV. The reaction of step A-2-1 is suitably carried out employing thionyl chloride and in excess thionyl chloride or in a solvent medium, preferably in an inert solvent of conventional type. The step A-2-1 reaction may be suitably carried out at temperatures in the range of from 20° C. to 150° C., and the acid halide product need not be recovered as such for subsequent use in step A-2-2.

The reaction of step A-2-2 is a conventional reaction which may be carried out in an inert organic solvent or in an excess of the amine compound V if a liquid under the reaction conditions. Reaction temperatures may range from 0° C. to 100° C. and the product compound IV may be isolated by working up by conventional procedures.

Alternatively, the compounds II'' which are esters, i.e., in which $R_1'$ is other than hydrogen and said $R_1'$ is a good leaving group which is not sterically hindered, e.g., $R_1'$ is lower alkyl, p-nitrophenyl, cyanomethyl and the like, may be reacted a step A-2-3 with an amine of formula V in the presence of a basic catalyst such as an alkali metal alkoxide, e.g., sodium methoxide to obtain directly a compound IV as product. Such reaction is preferably carried out at elevated temperatures and under pressure in an inert solvent medium which may be provided by employing an excess of the amine of formula V or by an inert organic solvent of conventional type, e.g., a lower alkanol such as ethanol. Reaction temperatures are preferably in the range of 100° C. to 180° C. and the product of formula IV may be isolated from the reaction by conventional procedures.

The N-oxide compounds of the invention are preferably produced in a known manner from compounds IA of the invention, for example, by reaction of compounds IA with a suitable oxidizing agent to obtain the N-oxides of the formula IB:

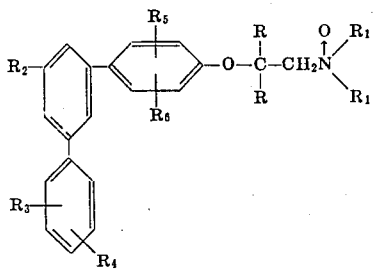

(IB)

wherein R, $R_1$, $R_2$, $R_3$, $R_4$, $R_5$ and $R_6$ are as previously defined.

The production of the N-oxide compounds IB as above summarized may be carried out by the established procedures involving reaction of compound IA with peracid, e.g., perbenzoic acid, m-chloroperbenzoic acid or peracetic with or without a solvent, e.g., chloroform, as may be desired or required depending respectively upon the selection of liquid or solid oxidizing agents, at temperatures between room temperature up to about 90° C. The production of the N-oxides is preferably carried out with a peroxide by established procedures, for example, by reaction of a compound IA with hydrogen peroxide in a suitable solvent at temperatures between room temperature up to about 90° C. Examples of preferred organic solvents typically employed include ethanol, acetic acid and acetic anhydride. The N-oxide may be isolated for the reaction mixture by working up by established procedures.

A preferred process for preparation of intermediate compounds II-A is summarized below, as follows:

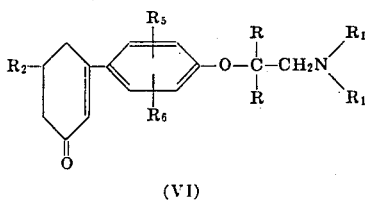

(VI)

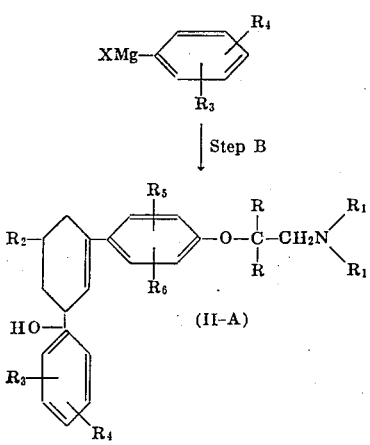

(II-A)

wherein R, $R_1$, $R_2$, $R_3$, $R_4$, $R_5$ and $R_6$ are as previously defined and X is halo of atomic weight of from 35 to 127, i.e., chloro, bromo, or iodo.

As illustrated above, compound II-A may be produced by the reaction Step B involving reaction of compounds VI which is a 3-p-(ω-aminoalkoxy)phenyl-2-cyclohexen-1-one, with an appropriate Grignard compound VII. The reaction of step B involving compounds VI with the well-known Grignard compound VII to produce compound II-A is carried out in a conventional manner in the presence of an inert organic solvent and preferably at temperatures between about −10° C. to +80° C., followed by hydrolysis in the conventional manner, i.e., in a neutral medium such as water or saturated ammonium chloride solution. Preferred solvents are those customarily employed in Grignard reactions, including, by way of illustration, tetrahydrofuran, dioxane and the ethers such as diethyl ether, more preferably tetrahydrofuran. The intermediate compound of formula VI may be produced starting from available and/or known materials by any of the several preferential reaction sequences. One such preferred method for production of compound VI may be carried out as illustrated below in which R, $R_1$, $R_5$, $R_6$, $R_x$, X and M have the above-defined meaning, $R_2'$ is the same as $R_2$ excluding hydrogen and R' represents lower alkyl of one or two carbon atoms, preferably ethyl.

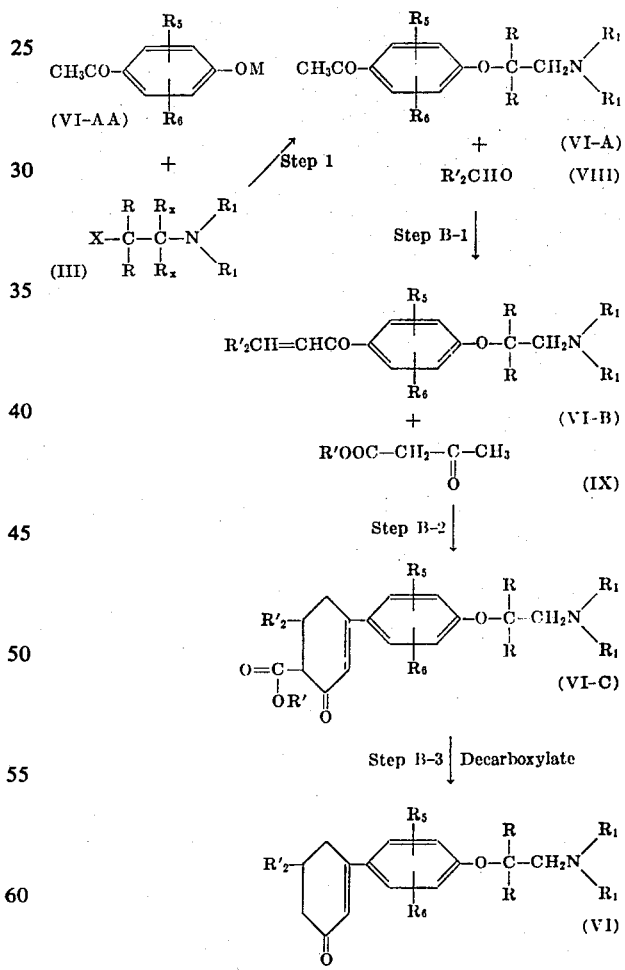

The compound VI-A which is a 4-(ω-aminoethoxy)-acetophenone is prepared by step 1 involving reaction of a compound III with a compound VI-AA which is an alkali metal salt of the known class of compounds which are p-hydroxyacetophenones. The reaction of step 1 is analogous to step A-1. Compounds VI-A are also known or can be readily produced by established procedures, for example, production by reaction of step 1 involving compounds III in which $R_x$ is hydrogen is described in British Pat. No. 377,464 and in Chemical Abstracts, 1933, 4031. Compounds VI-A are similarly produced from compounds III in which $R_x$ is lower alkyl.

The production of compound VI-B by reaction of compound VI-A and a benzaldehyde (compound VIII) in step B-1 involves a condensation of the known Claisen reaction type analogous, for example, to typical procedures for preparation of well-known compounds such as chalcone. The reaction of step B-1 is carried out in the presence of a base preferably at temperatures between 0° C. to 40° C., more preferably 15° temperatures C. to 25° C., and in a suitable inert organic solvent for reactants and product. Illustrative of suitable bases are the alkali metal hydroxides, preferably sodium hydroxide. The preferred solvents are the alcohols such as ethanol. The product compound VI-B is usually recovered in the form of the acid addition salt, e.g., the hydrochloride, and may be converted to the free base by conventional procedures.

The production of compound VI-C by step B-2 involving reaction of compound VI-B and compound IX is conducted under substantially anhydrous conditions in the presence of a base, preferably an alkali metal carbonate such as potassium carbonate, and in an inert organic solvent such as a lower alkanol, preferably ethanol. The reaction may be carried out at temperatures between 0° C. to 90° C., although it is usually desirable to regulate reaction temperatures in a preferred range between 15° C. and not have above 60° C., during a substantial period after commencement of the reaction. Reaction time is usually lengthy involving typically at least several hours or a matter of days, more usually a period between 12 hours to 3 days. Compounds IX are known or readily produced from available materials by known procedures. The especially preferred compound IX is ethyl acetoacetate.

Compound VI is produced in step B-3 by decarboxylation of compound VI-C. The decarboxylation may be of a generally conventional type and carried out, for example, by subjecting compound VI-C to heating at elevated temperatures in the presence of a suitable decarboxylating reagent, preferably a strong base such as an alkali metal or alkaline earth metal hydroxide, more preferably sodium hydroxide. The decarboxylation as preferably conducted in an organic solvent at reflux temperature usually involves several hours time.

Compound VI are also produced by alternate routes also involving preferred reaction schemes as illustrated by the reaction sequence immediately below in which R, $R_1$, $R_2'$, $R_5$, and R' have the previously defined meaning, and $R_2''$ is the same as $R_2'$ but excluding Y and Y' being alkoxy.

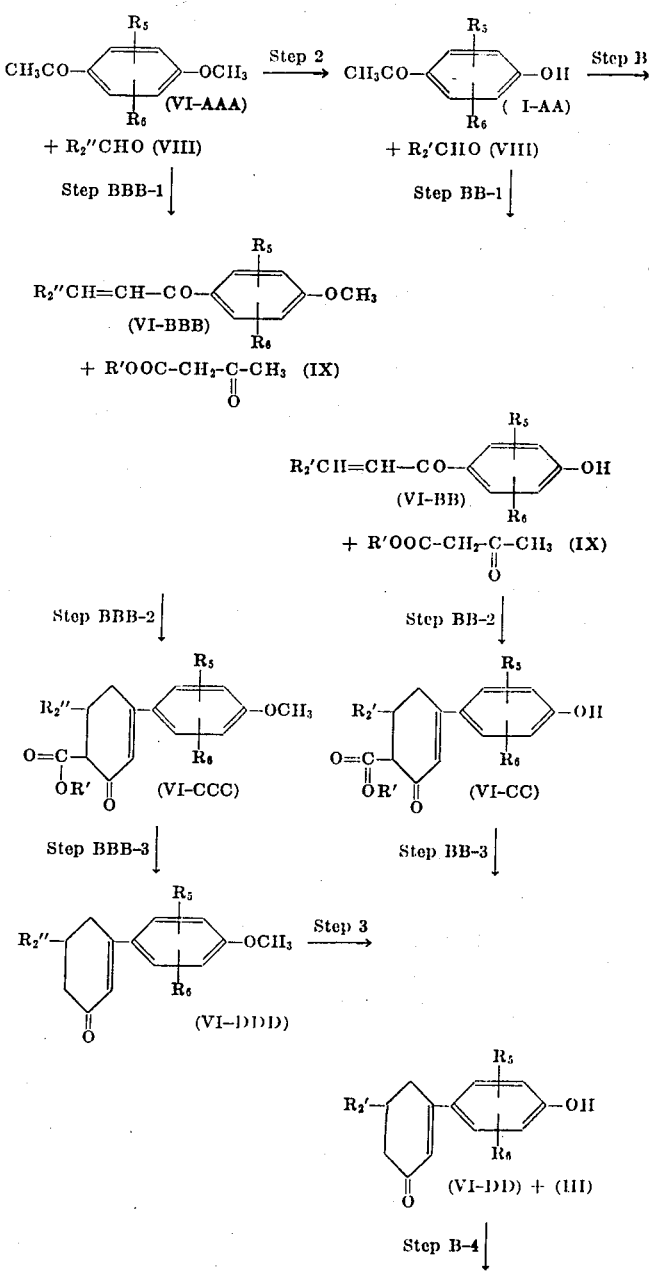

The starting compound VI–AAA for the reaction Step BBB–1 in the step BBB reaction series is a p-methoxyacetophenone which is a known or readily prepared material. Compound VI–AAA can be readily converted by well-known procedures in a step 2 to previously indicated compound VI–AA which is the starting material for the reactions of the step BB series.

The reaction of step BBB–1 is readily carried out analogously to the previously described step B–1. Compounds VI–BBB are of a well-known class as is their preparation by the reaction of step BBB–1.

Similarly, the reaction of step BBB–2 is readily carried out analogously to step B–2. Preferred reaction temperatures for step BBB–2 involve regulation within the range of 15° C. to 40° C.

The reaction of step BBB–3 to produce compound VI–DDD is readily carried out analogously to step B–3.

Compound VI–DDD may be converted to compound VI–DD in step 3 by conventional procedures. The preferred method of step 3 involves reaction of compound VI–DDD with a metallic chloride of a known suitable type, preferably aluminum chloride. The reaction is preferably carried out at reflux temperature in the presence of an appropriate organic solvent of which xylene is a preferred example. Reaction times vary typically between about 1 to 10 hours with the reaction mixture preferably cooled to below room temperature and combined with a cold aqueous system prior to recovery by conventional procedures.

Compound VI–DD is converted to the intermediate compound VI by step B–4 involving reaction of the alkali metal salt of compound VI–DD with compound III. step B–4 is readily carried out analogously to previously described step 1.

Compound VI–DD may also be produced by the step BB reaction sequence involving the individual steps BB–1, BB–2 and BB–3. In said reaction sequence step BB–1 is carried out analogously to previously described step B–1, step BB–2 is carried out analogously to step B–2 and step BB–3 is analogous to step B–3.

Production of a compound VI by the preferred reaction sequence involving the step BBB series reactions followed by steps 3 and B–4 is exemplified hereinafter in examples 1–4 beginning with well-known compound VI–BBB.

A preferred method of preparation of the compounds of formula II–C involves in a first step C–1 the reaction of a compound of formula X:

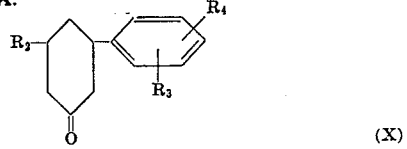

(X)

wherein $R_2$, $R_3$ and $R_4$ are as defined, with a p-(ω-aminoethyoxy)-phenyl magnesium halide of formula XI:

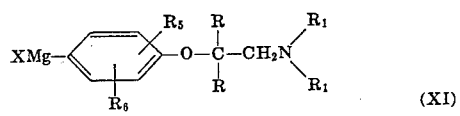

(XI)

wherein R, $R_1$, $R_2$, $R_3$, $R_4$, $R_5$, $R_6$ and X are as defined, followed by hydrolysis in a conventional manner to obtain the compound of formula XII:

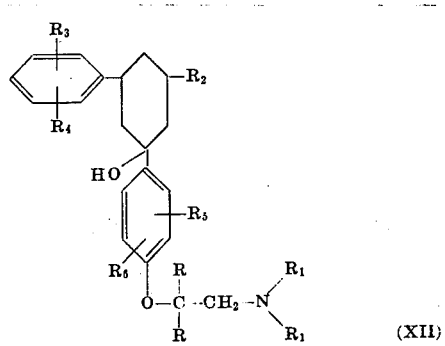

(XII)

wherein R, $R_1$, $R_2$, $R_3$, $R_4$. $R_5$ and $R_6$ are as defined, said compound XII then being subjected in a step C–2 to acid dehydration to obtain the corresponding compound of formula II–C.

The preparation of compound XII by step C–1 involves the reaction of a 3-phenyl-cyclohexane-1-one of formula X with the Grignard compound of formula X which is a p-(ω-aminoethoxyl-magnesium halide. The reaction of step C–1 may be suitably carried out similarly to the reaction of step B, above-described. The starting compounds of formula X and XI are either known or may be prepared from known materials by established procedures.

The preparation of compounds II–C by step C–2 involves a dehydration of compound XII which may be carried out in a conventional manner in an organic solvent at temperatures in the range of 20° C. to 150° C., preferably 30° C. to 80° C. Suitably solvents are of conventional type which provide an inert medium, e.g. the alcohols such as ethanol. The preferred acid dehydration agents are the strong inorganic acids such as the hydrogen halides, more preferably hydrogen chloride. The product compound II–C may be recovered from the reaction mixture of step C–2 by working up by established procedures.

A preferred method of preparation of the compounds of formula II–D involves in a step D the reaction of a compound of the formula XIII:

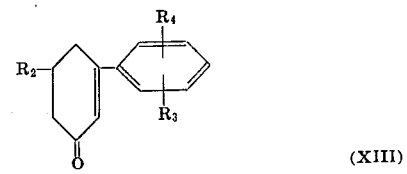

(XIII)

wherein $R_2$, $R_3$ and $R_4$ are as defined, with a Grignard compound of formula XI as defined above, to obtain a compound of formula II–D:

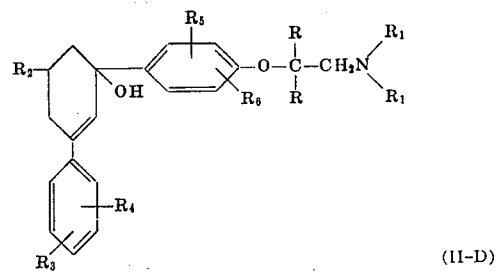

(II-D)

wherein R, $R_1$, $R_2$, $R_3$, $R_4$, $R_5$ and $R_6$ are as defined.

The preparation of compound II–D by step D may be carried out analogously to the previously described reaction of step C–1. The compounds XIII employed as starting material in step D are either known or can be prepared from known material by established procedures.

It will be evident that various other procedures may occur to those skilled in the art for preparing compounds represented by the general formula II. It will also be evident that certain compounds represented by the formula II may be employed to obtain other of such compounds. For example, compounds II–A may be subjected to dehydration by procedures known per se to obtain the cyclohexen-dienes of formula II–B. In general, while certain preferred compounds of the formula II have been specifically described for the preparation of compound IA by step A, it will be noted that my invention encompasses the preparation of compound IA from other compounds as represented by the general formula II so long as the ring in the compound II forming the phenyl ring in compound I is a ring which is not fully unsaturated, i.e. not a phenyl ring, and thus will undergo dehydrogenation with or without accompanying dehydration as required to remove any hydroxy group pendent from said ring of compound II at a biphenyl position thereof, i.e. at the position at which one of the pendent aromatic groups is attached. Thus, the compounds II may be those having one or two double bonds, a single pendent hydroxy group or a combination of a single double bond and a single hydroxy group. For example, a compound of the formula XII may be employed as a compound II by isolating from its reaction mixture and subjecting to simultaneous dehydration and dehydrogenation to obtain a compound of formula IA. It will also be noted that other compounds II not otherwise specifically described herein may be analogously obtained, for example, by replacing the 4'-chalcone compounds VI-B, VI-BB and VI-BBB by the corresponding 4-chalcones which may be obtained by reacting an appropriately substituted or unsubstituted acetophenone with an appropriately substituted or unsubstituted 4-benzaldehyde analogously to steps B-1, BB-1 and BBB-1 respectively, followed by converting said 4-chalcones by the remainder of the step B, BB or BBB reaction sequences to obtain by reaction analogous to steps B-3 or B-4 a 5-[4-(ω-aminoalkoxy)phenyl]-3-phenyl-2-cyclohexen-1-one which may be then converted analogously to step B to obtain a 5-[4-(ω-aminoalkoxy)phenyl]-1,3-diphenyl-2-cycohexen-1-ol also useful as an intermediate compound II in the practice of the invention. The preparation of such 1,3-diphenyl-2-cyclohexen-1-ols referred to herein as compounds II-E is illustrated immediately below in a reaction series B' which is analogous to reaction series B wherein R, $R_1$, $R_2'$, $R_3$, $R_4$, $R_5$, $R_6$, R' and X are as above-defined.

In the above-illustrated reaction Sequence B' for prepara-

The important intermediate compounds of formula II' are new compounds which may be produced starting from known and/or available material by one or more reaction sequences including sequences of which the first parts thereof have already been described with respect to preparation of intermediate compound VI. The latter sequences may be continued to produce compounds II' as illustrated immediately below in which R, $R_1$, $R_2'$, $R_3$, $R_4$, $R_5$ and $R_6$ have the meaning previously assigned and $R_3'$ and $R_4'$ are hydrogen, halo of atomic weight of from 19 to 80, lower alkyl or phenyl (thus also qualifying $R_3$ and $R_4$ in compound VII in step BBB-4, below).

The production of compounds VI-EEE by step BBB-4 is carried out analogously to previously described reaction of step B.

Compounds VI-EE are produced from compounds VI-EEE by the reaction of step 4 which is analogous to previously described step 2.

Compounds VI-EE are also produced as illustrated by step BB-4 which is analogous to previously described step B.

The production of the important intermediate compounds II' from compounds VI-EE in step BB-5 involves a dehydra-

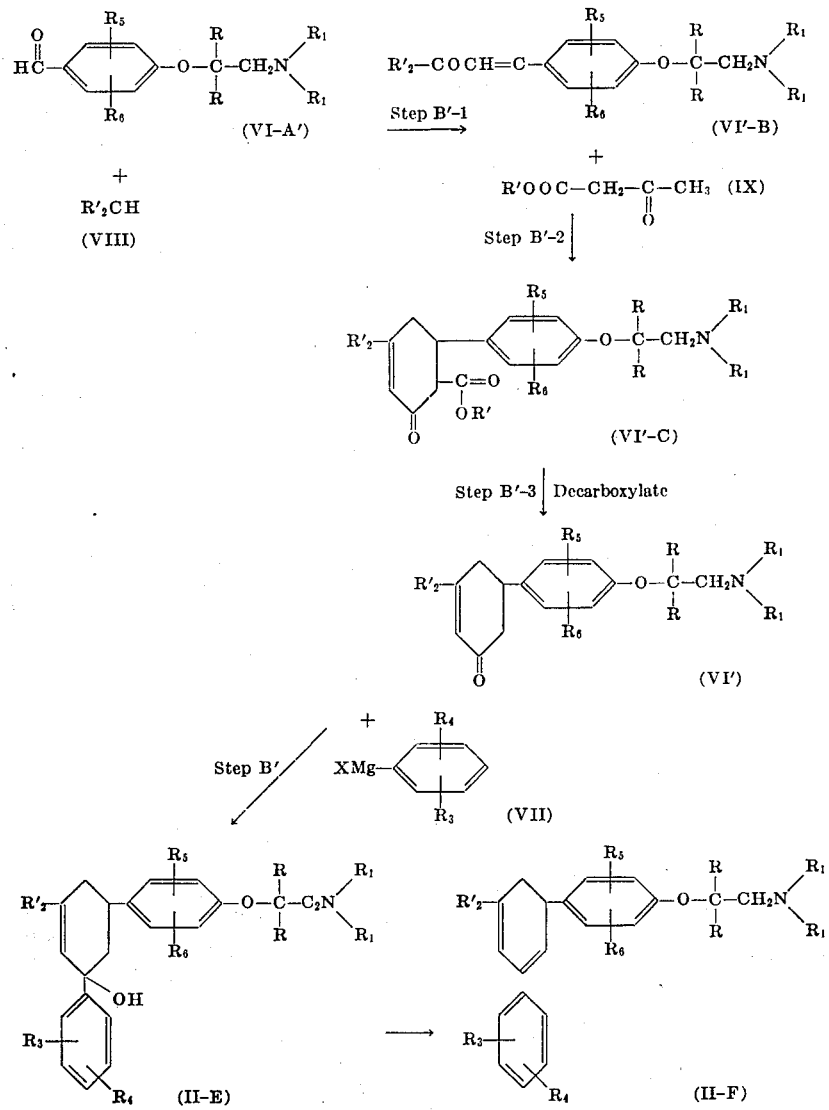

tion of compounds II-E the individual reaction steps B'-1, B'-2, B'-3 and B' are carried out analogously to previously described reaction steps B-1, B-2, B-3 and B, respectively.

The cyclohexen-dienes of formula II-F may be prepared from compounds II-E by subjecting the latter to dehydration by known procedures in the same manner that compounds II-B may be obtained from compounds II-A.

tion and dehydrogenation which may be carried out analogously to previously described step A.

The production of compounds VI-FFF from compounds VI-EEE by step BBB-5 involves a dehydration and dehydrogenation carried out analogously to step A.

The important intermediate compounds II' are produced from compounds VI-FFF by step 5 which is analogous to step 2.

The important intermediate compounds of formula II" may be prepared from compounds II' by reacting the latter analogously to step A-1 with the appropriate halo derivative of the side chain to be introduced.

The preparations above-described in detail for obtaining the important intermediate compounds VI and II' (and thus also compounds II") have been with reference to the preparation of said compounds VI and II' in which $R_2$ is other than hydrogen. The compounds VI-DDD and VI-DDD in which $R_2'$ or $R_2''$ is hydrogen are known or can be prepared from known materials by established procedures. Thus, compounds VI in which $R_2$ is hydrogen may be readily obtained by reacting a compound VI-DD in which $R_2'$ is hydrogen with a compound III analogously to step A-1. Compounds II' in which $R_2$ is hydrogen are readily prepared, for example, by reacting a compound VI-DDD in which $R_2''$ is hydrogen analogously to step BBB-4 to obtain a compound VI-EEE in which $R_2''$ is hydrogen and then reacting said compound VI-EEE analogously to step 4 to obtain the compound VI-EE in which $R_2'$ is hydrogen, followed by dehydration and dehydrogenation analogous to step BB-5 to obtain a compound II' in which $R_2$ is hydrogen. Or, a compound of VI-DD in which $R_2'$ is hydrogen may be reacted with a compound VII analogously to step BB-4 to obtain a compound VI-EE in which $R_2'$ is hydrogen, followed by dehydration and dehydrogenation of said compound VI-EE by step BB-5 to obtain a compound II' in which $R_2$ is hydrogen. Or a compound VI-EEE may be reacted analogously to step BBB-5 to obtain a compound VI-FFF in which R is hydrogen followed by reaction analogous to step 5 to obtain compounds II' in which $R_2$ is hydrogen.

An alternate process which may be employed for preparation of compounds IA of the invention in which $R_2$ is hydrogen involves starting with a previously described intermediate compound VI-DDD, VI-DD or VI in which $R_2'$ or $R_2''$ (as previously defined) is phenyl by reaction of such a compound with a suitable reducing agent to obtain an intermediate compound of the formula XIV:

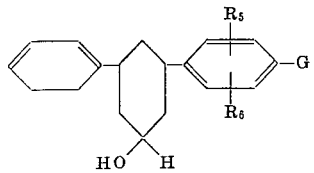

wherein $R_5$ and $R_6$ are as defined, and G is methyl, hydroxy or the ω-aminoalkoxy moiety depending respectively on whether one proceeds from a compound VI-DDD, VI-DD or VI. The reduction of a compound VI-DDD, VI-DD or VI to obtain compound XIV involves a reduction of known type preferably carried out in an inert solvent at low temperatures between −70° C. to −20° C. Suitable reducing agents are well-known although it is generally preferred to use sodium borohydride. Compounds XIV in which G is methoxy may be dehydrogenated employing thionyl chloride by reaction conducted analogously to step A to obtain a 4-methoxy-m-terphenyl which is converted analogously to previously described step 2 to the corresponding 4-hydroxy-m-terphenyl. The latter compound is then converted analogously to step A-1 to compound IA in which $R_2$ is hydrogen. Similarly, compound XIV in which G is hydroxyl may be converted analogously to described step A to a 4-hydroxy-m-terphenyl and subsequently, as described above, to compound IA in which $R_2$ is hydrogen. Compound XIV in which G is the ω-aminoalkoxy moiety may be converted directly to obtain compound IA in which $R_2$ is hydrogen by reaction with thionyl chloride analogous to step A, as exemplified hereinafter in example 11.

In all of the above-described processes for producing compounds of formulas IA and IB such compounds are conveniently recovered in the form of an acid addition salt, preferably the hydrochloride, and such salts, if desired, may be converted to the free base by conventional procedures.

Also, within the scope of the novel compounds provided by the invention are pharmaceutically acceptable salts not materially affecting the pharmacological effect of the compounds of formulas IA and IB. Such salts include the acid addition salts, e.g., the hydrochloride, fumarate, formate, acetate, citrate, sulfonate, malonate, tartrate, methane sulfonate, salicylate and hydrosulfate. Certain acid addition salts as produced by the invention may contain alcohol of crystallization such as the lower alkanols preferably employed in certain cases. Such alkanols are also within the scope of the invention as being generally pharmaceutically acceptable. The acid addition salts may be produced as desired from the corresponding free bases by conventional procedures. Conversely, the free bases may be obtained from either the salts or alkanol salts by procedures known in the art.

The compounds of structural formulas IA and IB and their pharmaceutically acceptable acid addition salts are useful because they possess pharmacological activity in animals. In particular, the compounds are useful as hypolipidemic agents having hypocholesteremic and/or hypotriglyceridemic activity, as indicated by tests on a group of white rates which are given 10–50 mg. per kg. of body weight per diem of the compound orally, for 6 days, followed by extraction with isopropanol of serum or plasma after anesthetizing the rats with sodium hexobarbital, and then noting the cholesterol and triglyceride contents as compared to those of a control group. The cholesterol and triglyceride contents are determined by the methods described by Lofland, H. B., Anal. Biochem. 9:393 (1964): (Technicon method N24a): and Kessler, G., and Lederer, H. Technicon Symposium, Mediad Inc., New York, pages 345–347, (1965), respectively. For such usage, the compounds may be administered orally as such or admixed with conventional pharmaceutical carriers. The dosage administered may vary depending on the particular compound employed, the therapy desired and the severity of the condition being treated. In general, satisfactory results are obtained when administered at a daily dosage of from about 1 milli-

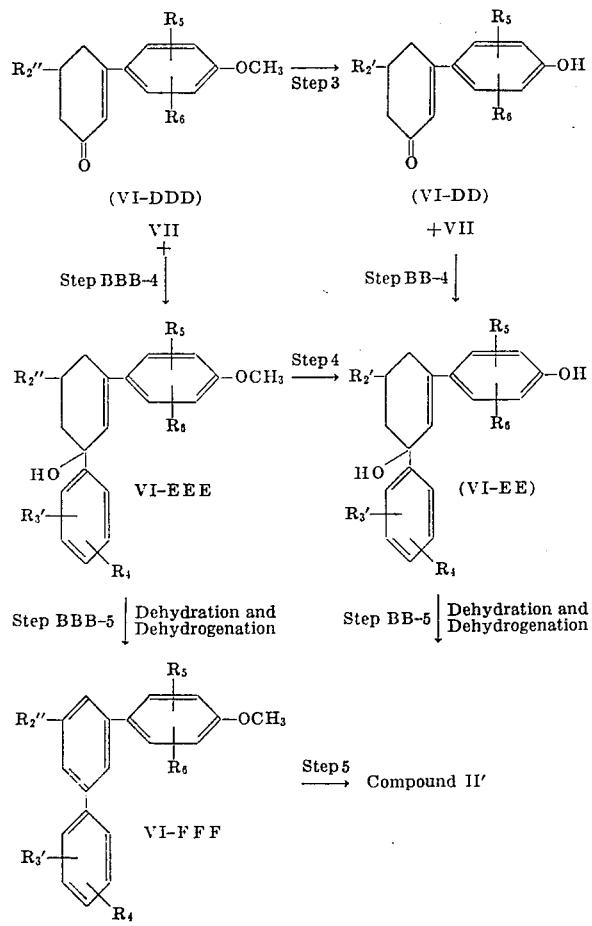

grams to about 50 milligrams per kilogram of animal body weight, preferably given in divided doses, two to four times a day, or in sustained release form. For most mammals the total daily dosage is from about 0.05 grams to about 0.4 grams of the compound, and the dosage forms suitable for internal use comprise from about 12.5 milligrams to about 200 milligrams of active compound in intimate admixture with a solid or liquid pharmaceutically acceptable carrier or diluent.

In most cases, the individual compounds I of the invention exhibit both hypocholesteremic and hypotriglyceridemic activity at more or less the same level as determined by the test standards employed. In the usual case test results indicate a preference for compounds in which $R_3$, $R_4$, Y and Y' are hydrogen. Increased activity has been indicated for compounds I which R is other than hydrogen as exemplified below in example 23. The compound of example 19 in which $R_2$ is pyridyl is of interest because of essentially selective activity in exhibiting substantially no hypocholesteremic effect while hypotriglyceridemic activity is at a high level.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredient | Weight (mg.) |
|---|---|
| 4-(2-Diethylaminoethoxy)-5'-phenyl-m-terphenyl hydrochloride | 50 |
| Tragacanth | 10 |
| Lactose | 197.5 |
| Corn starch | 25 |
| Talcum | 15 |
| Magnesium stearate | 2.5 |

Compounds of formula VI are also useful because of pharmacological activity in animals, for example, as hypolipidemic agents as indicated by the above-identified test on white rats at dosages of 10–50 mg. per kg. of body weight. Such compounds of formula VI may be employed for such usage in dosages, dosage forms and modes of administration similar to compounds of formula I.

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

EXAMPLE 1

4-(p-Methoxyphenyl)-2-oxo-6-phenyl-3-cyclohexene-1-carboxylic acid ethyl ester

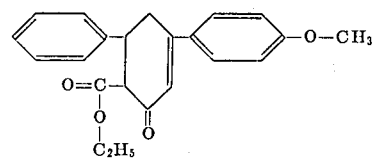

To a solution of 93 g. of 4'-methoxychalcone (a known compound) prepared by reaction of p-methoxyacetophenone and benzaldehyde dissolved in 6.5 liters absolute ethanol containing 54 g. anhydrous potassium carbonate is added 63.5 g. ethyl acetoacetate. The resulting mixture is stirred at room temperature (20° C.) for 22 hours, evaporated in vacuo to a thick slurry which is treated with 500 ml. methylene chloride. The resulting solution is filtered and the filtrate evaporated in vacuo to obtain a viscous oil which is taken up in 350 ml. 95 percent ethanol. The crude product is crystallized from the ethanol and recrystallization from ethanol gives 4-(p-methoxyphenyl)-2-oxo-6-phenyl-3-cyclohexene-1-carboxylic acid ethyl ester, m.p. 105.5°–107° C.

EXAMPLE 2

3-(p-Methoxyphenyl)-5-phenyl-2-cyclohexene-1-one

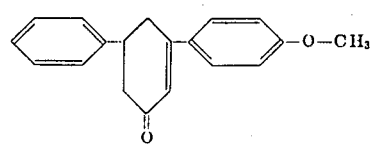

To a solution of 43 g. of 4-(p-methoxyphenyl)-2-oxo-6-phenyl-3-cyclohexene-1-carboxylic acid ethyl ester, obtained from example 1, dissolved in 860 ml. acetic acid is added 430 ml. hydrochloric acid. The resulting mixture is refluxed overnight, evaporated in vacuo to obtain a crude oil which is dissolved in 500 ml. methylene chloride. The resulting solution is washed first with 200 ml. water, then 200 ml. saturated sodium bicarbonate solution, and again with 200 ml. water. The organic phase is dried over anhydrous magnesium sulfate, evaporated in vacuo to remove solvent, and the resulting solid twice crystallized from 350 ml. ethanol to obtain yellow needles of 3-(p-methoxyphenyl)-5-phenyl-2-cyclohexene-1-one, m.p. 103°–104° C.

EXAMPLE 3

3-(p-Hydroxyphenyl)-5-phenyl-2-cyclohexen-1-one

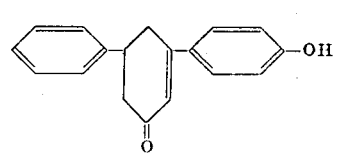

To a solution of 2.8 g. of 3-(p-methoxyphenyl)-5-phenyl-2-cyclohexen-1-one, obtained from example 2, dissolved under reflux in 50 ml. xylene is added a total of 2.32 g. of aluminum chloride in three separate additions. The resulting mixture is refluxed for 5 hours, cooled to 0° C., and poured onto 100 ml. crushed ice. The organic phase is separated, and dried over anhydrous magnesium sulfate. Crystallization occurs on evaporation in vacuo of the organic phase and the solid obtained is recrystallized from 95 percent ethanol to obtain 3-(p- hydroxyphenyl)-5-phenyl-2-cyclohexen-1-one, m.p. 201.5°–203°C.

EXAMPLE 4

3-[4-(2-diethylaminoethoxy)phenyl]-5-phenyl-2-cyclohexen-1-one

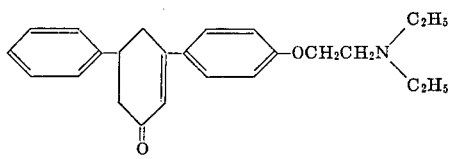

To a solution of 264 g. of 3-(p-hydroxyphenyl)-5-phenyl-2-cyclohexen-1-one, prepared as in example 3, dissolved in 2.5 liters of toluene there is added with stirring 310 g. pulverized potassium carbonate. Mixing is continued for about 1 hour and the mixture then heated to reflux. After about 2 hours at reflux, there is added 150 g. diethylaminoethyl chloride dissolved in 300 ml. toluene, and reflux continued overnight. The resulting mixture is cooled to 20° C. and 2.5 liters of ice water added. The organic phase is first washed with 3 liters water, and then with 1 liter saturated sodium chloride solution. The organic phase is dried over anhydrous sodium sulfate, and concentrated *in vacuo* (100 mm. Hg.) at 65° C. to remove toluene. The resulting oil is dissolved in 500 ml. cyclohexene, filtered, and cooled to 5° C. to crystallize 3-[4-(2-diethylaminoethoxy)phenyl]-5-phenyl-2-cyclohexen-1-one, m.p. 60.5°–61° C.

EXAMPLE 5

4-(2-Diethylaminoethoxy)-5'-phenyl-m-terphenyl hydrochloride

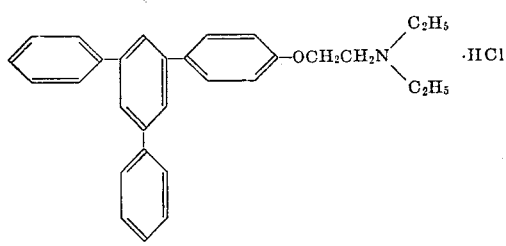

Step A: Preparation of 3-[4-(2-diethylaminoethoxy)phenyl]

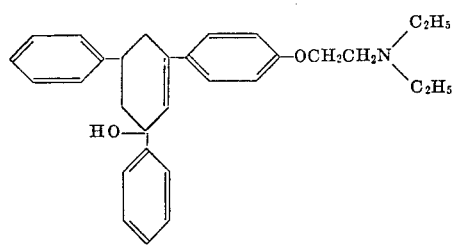

A solution of 36.5 g. of 3-[4-(2-diethylaminoethoxy)phenyl]-5-phenyl-2-cyclohexen-1-one prepared as in example 4 dissolved in 30 ml. dry tetrahydrofuran is slowly added dropwise with stirring to a solution of about 0.2 moles of freshly prepared phenylmagnesium bromide in 100 ml. of tetrahydrofuran, while maintaining the combined solutions during such addition at temperatures of about −5° C. (dry-ice-acetone bath). Thirty minutes after addition the resulting reaction mixture is allowed to warm to room temperature (20° C.) over a period of one hour. The reaction mixture is then quenched with 250 ml. of saturated ammonium chloride solution, and the resulting aqueous alkaline (pH 8–9) emulsion extracted three times each with 200 ml. diethyl ether. The combined ethereal extracts are first washed with 50 ml. saturated sodium chloride solution, and then extracted twice each with 200 ml. of a 10 percent solution of tartaric acid. The combined acidic extracts are back-washed twice each with 100 ml. of ether and then made basic (pH>10) with 50 percent sodium hydroxide. The resulting emulsion is extracted three times each with 200 ml. ether. The combined ethereal extracts are washed with 50 ml. saturated sodium chloride solution, dried over anhydrous magnesium sulfate and finally concentrated *in vacuo* to give a clear, bright yellow viscous oil of 3-(4-[2-diethylaminoethoxy]phenyl-1,5-diphenyl-2-cyclohexen-1-ol.

Step B: Preparation of 4-(2-diethylaminoethoxy)-5'-phenyl-m-terphenyl hydrochloride A solution of 36.3 g. of 3-(4-[2-diethylaminoethoxy]phenyl)-1,5-diphenyl-2-cyclohexen-1-one dissolved in 100 ml. dry methylene chloride is cooled with stirring to minus 50° C. (dry-ice-acetone bath), and there is added a solution of 11.9 g. thionyl chloride in 25 ml. methylene chloride at dropwise rate permitting maintenance of reaction mixture temperature between minus 40° C. to minus 50° C. Addition of the thionyl chloride causes temporary deep-red coloration. About 15 minutes after completion of the thionyl chloride addition the resulting solution tends to become red-brown and is stirred for an additional 1 hour at temperatures of minus 60° C. The reaction mixture is then poured onto a mixture of 50 g. of crushed ice and 100 ml. water and made alkaline (pH >10) by addition of 50 percent sodium hydroxide solution. The resulting mixture is then concentrated *in vacuo* to remove methylene chloride and then extracted three times each with 250 ml. ether. The extracts are combined, washed with 100 ml. saturated sodium chloride solution, dried over anhydrous magnesium sulfate, and concentrated *in vacuo* to a bright yellow oil which is dissolved in 150 ml. absolute ether. The resulting mixture is then treated with saturated solution of hydrogen chloride in ether with stirring during addition to give a light-yellow solid. The ether is decanted and the solid triturated four times each with 150 ml. absolute ether. The resulting crude hydrochloride salt is dissolved in a minimum amount of refluxing isopropanol and filtered over charcoal. The resulting filtrate is treated by addition of a few drops of concentrated hydrochloric acid and cooled on an ice-bath to give light-yellow microcrystals of 4-(2-diethyl-aminoethoxy)-5'-phenyl-m-terphenyl hydrochloride, m.p. 186°–189° C.

EXAMPLE 6

4-(2-Diethylaminoethoxy)-4''-methyl-5'-phenyl-m-terphenyl hydrochloride

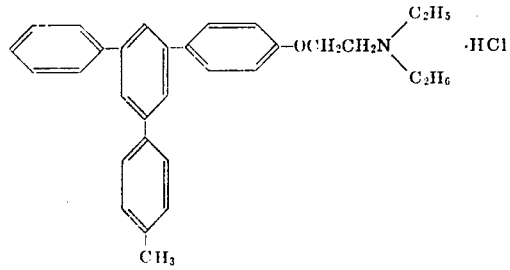

Step A: Preparation of 3-[4-(2-diethylaminoethoxy)phenyl]-1-(p-tolyl)-5-phenyl-2-cyclohexen-1-ol Following the procedure of step A of example 5, and employing equivalent amounts, 3-[4-(2-diethylaminoethoxy)phenyl]-5-phenyl-2-cyclohexen-1-one is reacted with P-methylphenylmagnesium bromide to obtain a crude oil of N,N-diethyl-2-(3'-p-methylphenyl-5'-phenyl-4-biphenyloxy)ethylamine hydrochloride.

Step B: Preparation of 4-(2-diethylaminoethoxy)-4''-methyl-5'-phenyl-m-terphenyl hydrochloride A solution of 30.6 g. of 3-[4-(2-diethylaminoethoxy)phenyl]-1-tolyl-5-phenyl-2-cyclohexen-1-ol dissolved in 150 ml. dry methylene chloride is cooled to minus 50° C. (dry-ice-acetone bath), and there is added a solution of 16 g. of thionyl chloride in 35 ml. of methylene chloride at dropwise rate permitting maintenance of reaction mixture temperature between minus 40° C. to minus 50° C. Addition of the thionyl chloride causes temporary deep-red coloration. The solution becomes red-brown and is stirred for at least an additional one hour at temperature of minus 60° C. The reaction mixture is then poured onto a mixture of 50 g. of crushed ice and 100 ml. water and made alkaline (pH >10) by addition of 50 percent sodium hydroxide solution. The resulting mixture is then concentrated in vacuo to remove methylene chloride and then extracted three times each with 250 ml. ether. The extracts are combined, washed with 100 ml. saturated sodium chloride solution, dried over anhydrous magnesium sulfate, and concentrated in vacuo to obtain a crude oil which is purified by column chromatography employing 500 g. silica and chloroform as eluent. The purified oil is dissolved in 150 ml. of absolute ether, and there is then added a saturated solution of hydrogen chloride in ether in amount to give a solid. The ether is decanted and the solid triturated four times each with 150 ml. absolute ether. The resulting crude hydrochloride salt is dissolved in a minimum amount of isopropanol and filtered over charcoal. The resulting filtrate is treated by addition of a few drops of concentrated hydrochloric acid, cooled on an ice-bath to give a crystalline solid which on recrystallization from a minimum amount of isopropanol gives 4-(2-diethylaminoethoxy)-4''-methyl-5'-phenyl-m-terphenyl hydrochloride, m.p. 150°–152° C.

EXAMPLE 7

4-[2-(Diethylamino)ethoxy]5'-phenyl-1,1':3',1''':4'':1'''-quaterphenyl hydrochloride

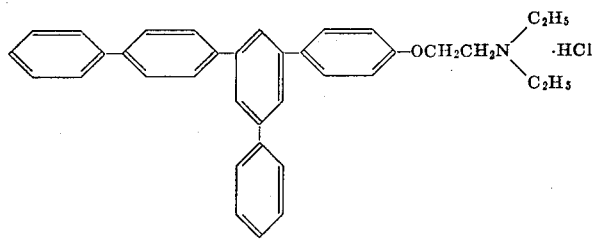

Step A: Preparation of 3-[4-(2-diethylaminoethoxy)phenyl]-1-(4-biphenylyl)-5-phenyl-2-cyclohexen-1-ol Following the procedure of step A of example 5, and employing equivalent amounts, 3-[4-(2-diethylaminoethoxy)phenyl]-5-phenyl-2-cyclohexen-1-one is reacted with p-biphenylmagnesium bromide to obtain a crude oil of 4-β-(diethylamino)ethoxy-5'-phenyl-1,1':3',141    :4'':1'''-quaterphenyl hydrochloride.

Step B: Preparation of 4-[2-(diethylamino)ethoxy]-5'-phenyl-1,1':3',1''':4''1''''-quaterphenyl hydrochloride Following the procedure of step B of example 6, and employing equivalent amounts, 3-[4-(2-diethylaminoethox-y)phenyl]-1-p-biphenyl-5-phenyl-2-cyclohexen-1-ol is reacted in thionyl chloride to obtain 4-[2-(diethytamino)ethoxy]-5'-phenyl-1,1':3',1''':4'':1''''-quaterphenyl hydrochloride, m.p. 117°–120° C.

EXAMPLE 8

4-(2-Diethylaminoethoxy)-5'-(p-chlorophenyl)-m-terphenyl hydrochloride

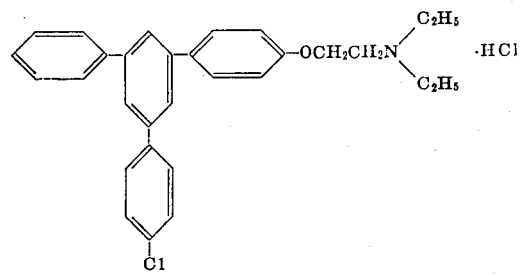

Step A: Preparation of 3-[4-(2-Diethylaminoethoxy)phenyl]-1-(4-chlorophenyl)-5-phenyl-2-cyclohexen-1-ol Following the procedure of step A of example 5, and employing equivalent amounts, 3-[4-(2-diethylaminoethox-y)phenyl]-5-phenyl-2-cyclohexen-1-one is reacted with p-chlorophenylmagnesium bromide to produce a basic emulsion which is extracted three times each with 200 ml. of ether and then once with 200 ml. of chloroform. Continuing as in step A of example 5, there is recovered on concentration in vacuo a crude oil of 3-[4-(2-diethylaminoethoxy)phenyl]-1-(4-chlorophenyl-5-phenyl-2-cyclohexen-1-ol.

Step B: Preparation of 4-(2-diethylaminoethoxy)-5'-(p-chlorophenyl)-m-terphenyl hydrochloride Following the procedure of step B of example 6, and employing equivalent amounts, 3-[4-(2-diethylaminoethox-y)phenyl]-1-(4-chlorophenyl-5-phenyl-2-cyclohexen-1-ol is reacted with thionyl chloride to obtain on concentration of the HCl wash and dried, combined basic ethereal extracts, a yellow oil which is purified by column chromatography employing 500 g. silica and an eluent compound of 90 percent chloroform and 10 percent methanol. The purified oil is dissolved in 150 ml. of absolute ether, and there is then added a saturated solution of hydrogen chloride in ether in amount to give a white solid. The ether is decanted and the solid triturated four times each with 150 ml. absolute ether. The crude hydrochloride salt is then dissolved in a minimum amount of refluxing isopropanol and filtered over charcoal. The hot filtrate is treated by addition of a few drops of concentrated hydrochloric acid and cooled on an ice-bath to obtain a solid which on elemental analysis is found to contain a non-stoichiometric amount of isopropanol of crystallization. The solid is then recrystallized employing a minimum amount of refluxing ethanol followed by addition of a small amount of absolute ether to obtain, after drying in vacuo at 65° C. white crystals of 4-(2-diethylaminoethoxy)-5'-(p-chlorophenyl)-m-terphenyl hydrochloride, m.p. 88°–90° C., with contained ethanol of crystallization.

EXAMPLE 9

4-(2-Diethylaminoethoxy)-5'-(p-methoxyphenyl)-m-terphenyl hydrochloride

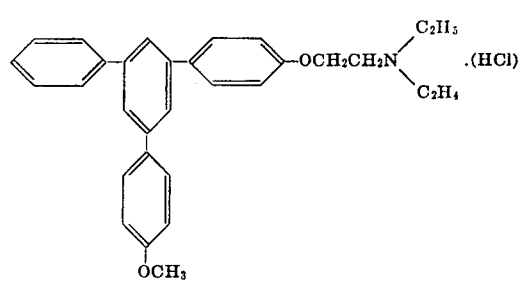

Step A: Preparation of 3-[4-(2-diethylaminoethoxy)phenyl]-1-(p-methoxyphenyl)-5-phenyl-2-cyclohexen-1-ol Following the procedure of step A of example 5, and employing equivalent amounts, 3-[4-(2-diethylaminoethoxy)phenyl]-5-phenyl-2-cylohexen-1-one is reacted with p-methoxyphenylmagnesium bromide to produce a basic emulsion which is extracted three times each with 200 ml. of ether and then once with 200 ml. of chloroform. Continuing as in step A of example 5, there is recovered on concentration *in vacuo* a crude oil of 3-[4-(2-diethylaminoethoxy)phenyl]-1-(4-methoxyphenyl)-5-phenyl-2-cyclohexen-1-ol.

Step B: Preparation of 4-(2-diethylaminoethoxy)-5'-(p-methoxyphenyl-m-terphenyl hydrochloride Following the procedure of step B of example 8, and employing equivalent amounts, 3-[4'-(2-diethylaminoethoxy)phenyl]-1-(4methoxyphenyl)-5-phenyl-2-cyclohexen-1-ol is reacted with thionyl chloride to obtain white crystals of 4-(2-diethylaminoethoxy)-5'-(p-methoxyphenyl-m-terphenyl hydrochloride, m.p. 88°–89° C., with contained ethanol of crystallization.

EXAMPLE 10

4-(2-Diethylaminoethoxy)-5'-(o-tolyl)-m-terphenyl hydrochloride

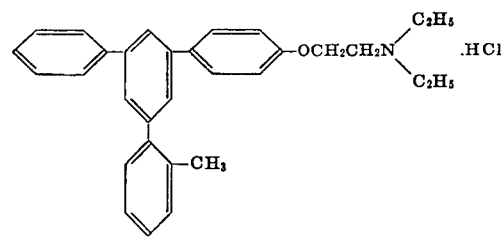

Step A: Preparation of 3-[4-(2-diethylaminoethoxy)phenyl]-1-(o-tolyl-5-phenyl-2-cyclohexen-1-ol Following the procedure of step A of example 5, and employing equivalent amounts, 3-[4-(2-diethylaminoethoxy)phenyl]-5-phenyl-2-cyclohexen-1-one is reacted with o-methylphenylmagnesium bromide to obtain a crude oil of N,N-diethyl-2-(3'-o-methylphenyl-5'-phenyl-4- -biphenyloxy)ethylamine hydrochloride.

Step B: Preparation of 4-(2-diethylaminoethoxy)-5'-(o-tolyl)-m-terphenyl hydrochloride Following the procedure of step B of example 6, and employing equivalent amounts, 3-[4-(2-diethylaminoethoxy)phenyl]-1-o-tolyl-5-phenyl-2-cyclohexen-1-ol is reacted with thionyl chloride to obtain 4-(2-diethyl-aminoethoxy-5'-(o-tolyl)-m-terphenyl hydrochloride, m.p. 154°–155° C.

EXAMPLE 11

4-[2-(diethylamino)ethoxy]-m-terphenyl hydrochloride

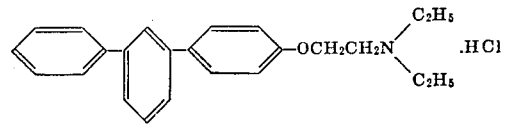

Step A: Preparation of 3-[4-(2-diethylaminoethoxy)phenyl]-5-phenyl-2-cyclohexen-1-ol A solution of 36.3 g. of 3-[4-(2-diethylaminoethoxy)phenyl]-5- -phenyl-2-cyclohexen-1-one is 50 ml. isopropanol is slowly added dropwise to a stirred suspension of 0.028 mol of sodium borohydride in isopropanol cooled to –60° C. by a dry-ice-acetone bath. The reaction mixture is stirred for an additional 1 hour at –60° C., and then overnight at room temperature. The resulting mixture is then cooled to 0° C., 2N ammonium chloride solution added, and the resulting mixture evaporated in vacuo to remove isopropanol. The resulting alkaline solution is extracted three times each with 100 ml. ether, the ethereal extracts combined, washed with saturated sodium chloride solution; dried over anhydrous magnesium sulfate, filtered, and concentrated in vacuo to obtain a clear oil of 3-[4-(2-diethylaminoethoxy)phenyl]-5-phenyl-2-cyclohexen-1-ol.

Step B: Preparation of 4-[2-diethylamino)ethoxy]-m-terphenyl hydrochloride.

Following the procedure of step B of example 6, and employing equivalent amounts, with the column chromatography conducted with an eluent composed of chloroform/methanol (98:2), 3-[4-(2-diethylamino-ethoxy)phenyl]-5-phenyl-2-cyclohexen-1-ol is reacted with thionyl chloride to obtain 4-[2-(diethylamino)ethoxy]-m-terphenyl hydrochloride; m.p. 183°–185° C.

EXAMPLE 12

4-(2-Dimethylaminoethoxy)-5'-phenyl-m-terphenyl N-oxide hydrochloride

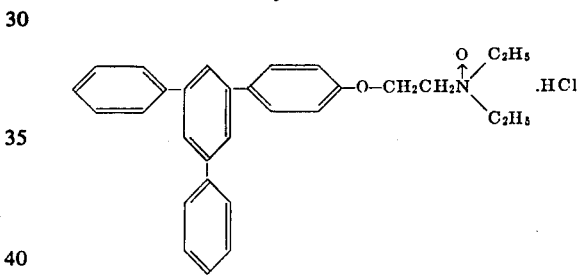

To a stirred solution of 8 g. of N,N-diethyl-2-(3',5'-diphenyl-4-biphenyloxy)ethylamine prepared as in example 5 dissolved in 5 ml. glacial acetic acid is added 2.84 ml. 30 percent hydrogen peroxide. The resulting mixture is stirred at 70° C. for 24 hours and concentrated *in vacuo* almost to dryness. The residue is diluted with 100 ml. water, made basic by addition of 50 percent sodium hydroxide, and extracted three times each with 200 ml. ether. The ethereal extracts are combined, washed with saturated sodium chloride solution, dried over anhydrous magnesium sulfate, and concentrated in vacuo to obtain an oil which is taken up in absolute ether to which an excess of hydrogen chloride saturated ether was added. A white solid results which is triturated with fresh ether, crystallized twice from a minimum of warm isopropanol and dried in vacuo for 3 days at room temperature to obtain 4-(2dimethylaminoethoxy)-5'-phenyl-m-terphenyl N-oxide hydrochloride, m.p. 159°–163° C.

EXAMPLE 13

4'-(2-Diethylaminoethoxy)chalcone hydrochloride

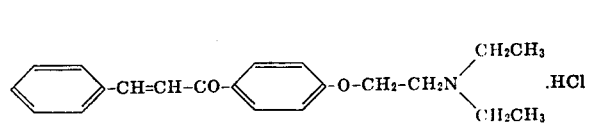

A solution of 47 g. of p-[β-(diethylamino)ethoxy] acetophenone, a known compound prepared according to British Pat. No. 377,464, and 20 g. of benzaldehyde dissolved in 100 ml. of ethanol is prepared and there is added thereto 80 ml. 2N sodium hydroxide with intensive stirring at room temperature. The resulting mixture is stirred for 24 hours at room temperature and evaporated in vacuo to remove solvent. The residue is taken up in 200 ml. water and the resulting basic mixture is treated by extraction with ethyl acetate, the organic phase evaporated in vacuo to dryness, and the residue recrystallized twice from ethanol to given 4'-(2-diethylaminoethoxy)chalcone hydrochloride, m.p. 167°–168.5° C.

EXAMPLE 14

4'-(2-Diethylaminoethoxy)-3-(3-pyridyl)-acrylophenone

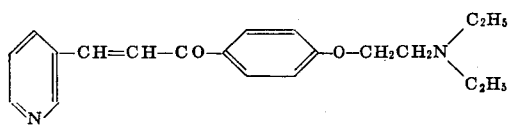

A solution of 12 g. of nicotinaldehyde and 27 g. of β-diethyl-aminoacetophenone dissolved in 100 ml. of ethanol is prepared, and there is added to 100 ml. of 2N sodium hydroxide with intensive stirring at room temperature. The resulting mixture is stirred for 4 hours at room temperature, evaporated in vacuo to remove solvent and the resulting residue taken up in 100 ml. of water. The resulting basic mixture is treated by extraction with ethyl acetate, the organic phase evaporated in vacuo to dryness and the residue recrystallized twice from c-hexane to given 4'-(2-diethylaminoethoxy)-3-(pyridyl)-acrylophenone; m.p. 64°–65.5° C.

By this example there is also similarly prepared on recrystallization from isopropanol the dihydrochloride of 4'-(2-diethylaminoethoxy)-3-(3-pyridyl)-acrylophenone; m.p. 195°–197° C.

EXAMPLE 15

Ethyl-4-[4-(2-diethylaminoethoxy)phenyl]-2-oxo-6-(3-pyridyl)-cyclohexene-1-carboxylate

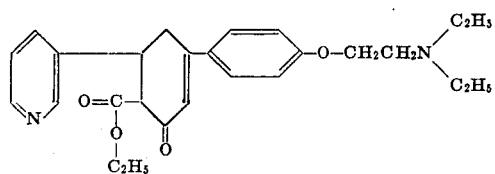

A mixture of 33 g. of 4'-(2-diethylaminoethoxy)-3-(3-pyridyl) acrylophenone prepared as in example 14, 16.8 g. of ethyl acetoacetate, and 14.1 g. of potassium carbonate in 1200 ml. of ethanol is stirred for 24 hours at room temperature, then for 19 hours at 50° C., and finally for 3.5 hours at 80° C. The resulting mixture is concentrated *in vacuo* to remove solvent, and the residue taken up in 500 ml. ether to form a solution which is filtered, and then concentrated in vacuo to obtain a crude oil of ethyl-4-[4-(2-diethylaminoethoxy)phenyl]-2-oxo-6-(3-pyridyl)cycbhexen-1-carboxylate.

EXAMPLE 16

3-[4-(2-Diethylaminoethoxy)phenyl]-5-(3-pyridyl)-2-cyclohexen-1-one

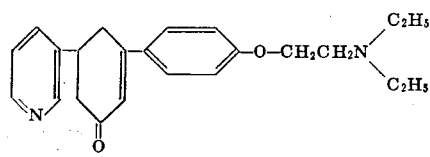

A solution of 18 g. of ethyl-4-[4-(2-diethylaminoethoxy)phenyl]-2-oxo-6-(3-pyridyl)cyclohexen-1-carboxylate obtained in example 15 in 56 ml. of methanol is treated by addition thereto with stirring of a solution of 6.4 g. sodium hydroxide in 50 ml. water. The resulting mixture is refluxed for 4 hours, the methanol removed by distillation, and 37 ml. of 50 percent hydrochloric acid solution slowly added. The resulting mixture is again refluxed for 4 hours and then made alkaline (pH >10) by addition of 50 percent sodium hydroxide solution. The resulting mixture is extracted twice each with 200 ml. ether, the combined ethereal extracts washed with saturated sodium chloride solution, dried over anhydrous magnesium sulfate, and concentrated in vacuo to obtain a crude oil of 3-[4-(2-diethylaminoethoxy)phenyl]-4-(3-pyridyl)-2-cyclohexene-1-one.

EXAMPLE 17

3-[4-(2-Diethylamino)ethoxy]-m-terphenyl-5'-yl pyridine hydrochloride

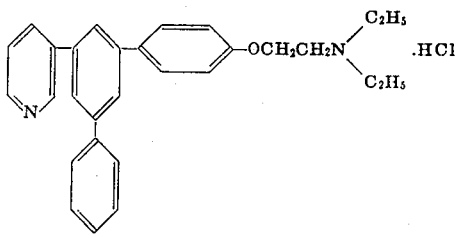

Step A: Preparation of 3-[4-(2-diethylaminoethoxy)phenyl]-1-phenyl-5-(3-pyridyl)-2-cyclohexen-1-ol Following the procedure of step A of example 5, and employing equivalent amounts, ethyl-4-[4-(2-diethylaminoethoxy)phenyl]-2-oxo-6-(3-pyridyl)-3-cyclohexen-1-one obtained from example 16 is reacted with phenylmagnesium bromide to obtain a crude oil of 3-[4-(2-diethylamino-ethoxy)phenyl]ethoxy)phenyl]-1-phenyl-5-(3-pyridyl)-2-cyclohexene-1-ol.

Step B: Preparation of 3-[4-(2-diethylamino)ethoxy]-m-terphenyl-5'-yl pyridine hydrochloride Following substantially the procedure of step B of example 5, and employing equivalent amounts, 3-[4-(2-diethylaminoethoxy)phenyl]-1-phenyl-5-(3-pyridyl)-2-cyclohexen-1-ol is reacted with thionyl chloride to obtain after twice recrystallizing from isopropanol/ethanol (9:1) white crystals of 3-[4-(2-diethylamino)ethyoxy]-m-terphenyl-5'-yl pyridine hydrochloride, m.p. 166°–173° C.

EXAMPLE 18

3-(p-Methoxyphenyl)-1,5-diphenyl-2-cyclohexen-1-ol

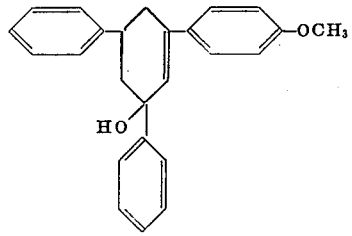

Following the procedure of step A of example 5, and employing equivalent amounts 3-(p-methoxyphenyl)-5-phenyl-2-cyclohexene-1-one, prepared as in example 2, is reacted with phenylmagnesium bromide to obtain a viscous yellow oil of 3-(p-methoxyphenyl)-1,5-diphenyl-2-cyclohexen-1-ol.

EXAMPLE 19

5'-(p-Methoxyphenyl)-m-terphenyl

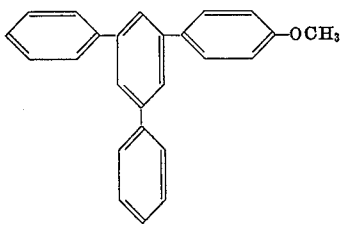

A solution of 480 g. of 3-(p-methoxyphenyl)-1,5-diphenyl-2-cyclohexen-1-ol in 2500 ml. methylene chloride is cooled to minus 50° C. and there is added thereto 195 ml. thionyl chloride in 400 ml. methylene chloride. The resulting mixture is maintained at minus 50° C. for 1 hours, allowed to warm to 0° C., and then is poured onto mixture of 2 kilograms crushed ice and a concentrated solution of 10 mols sodium hydroxide. The organic phase is separated and evaporated *in vacuo* to obtain a thick slurry which is filtered. The recovered solid is recrystallized from isopropanol to obtain 5'-(p-methoxyphenyl)-m-terphenyl, m.p. 132°–136° C.

EXAMPLE 20

5'-Phenyl-m-terphenyl-4-ol

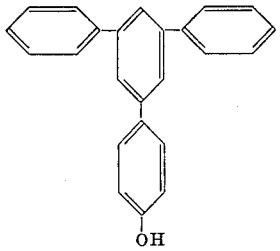

A solution of 230 g. of 5'-(p-methoxyphenyl)-m-terphenyl obtained from example 19 in 1000 ml. xylene is heated to 125° C. and there is added thereto 160 g. aluminum chloride. The resulting mixture is refluxed for 5 hours, cooled to 100° C., and poured onto 2 kilograms of crushed ice. The organic phase is allowed to separate, is dried over magnesium sulfate, heated with 1 liter of petroleum ether and cooled to 0° C. overnight. The resulting precipitate is filtered and the crude product is crystallized from 500 ml. cyclohexane and the solids recovered by filtration after allowing to stand 2.5 days at 5° C. This material is then recrystallized from a 1:1 mixture of cyclohexane and benzene using 50 g. of charcoal to remove impurities, to obtain 5'-phenyl-m-terphenyl-4-ol, m.p. 127°–130° C.

EXAMPLE 21

4-(1,1-Dimethyl-2-dimethylaminoethoxy)-5'-phenyl-m-terphenyl hydrochloride

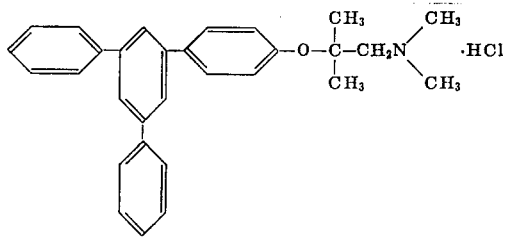

A suspension of 5'-phenyl-m-terphenyl-4-ol (prepared in example 20) dissolved in 100 ml. of toluene containing a twofold excess of anhydrous potassium carbonate is brought to reflux for 1.5 hours, 8.5 g. of N,N-dimethyl-1,1-dimethyl-2-chloroethyl amine hydrochloride added, and the resulting mixture allowed to reflux overnight with stirring. During the reaction, the N,N-dimethyl-1,1-dimethyl-2-chloroethyl amine rearranges to a N,N-dimethyl-2-methylpropyl species as predicted by J. F. Kerwin et al. J.A.C.S. 69, 2961 (1947). The reaction mixture is then filtered, the filtrate concentrated *in vacuo*, the resulting residue taken up in 150 ml. ether, washed first with 200 ml. of 2N sodium hydroxide solution, then saturated sodium chloride solution, and then dried over anhydrous magnesium sulfate. The solution is then concentrate in vacuo to obtain a crude oil which is purified by column chromatography employing 400 g. silica and eluent composed of 90 percent chloroform and 10 percent methanol. The purified oil is then taken up in 150 ml. absolute ether and treated with hydrogen chloride saturated ether. The resulting solid is triturated with ether, then dissolved in a minimum of refluxing isopropanol, the solution filtered over charcoal, treated with a few drops of concentrated hydrochloric acid, and cooled to obtain crystals of 4-(1,1-dimethyl-2-dimethylaminoethoxy)-5'-phenyl-m-terphenyl hydrochloride, m.p. 218.5°–220° C.

EXAMPLE 22

4-(2-Dimethylaminoethoxy)-5'-phenyl-m-terphenyl hydrochloride

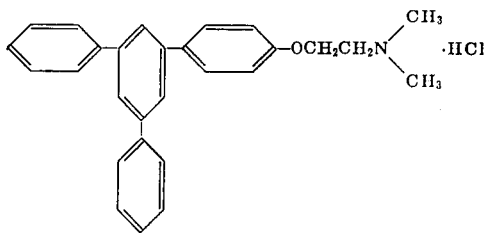

Following the procedure of example 21, and employing equivalent amounts, 5'-phenyl-m-terphenyl-4-ol is reacted with 2-chloro-N-,M-dimethyl-ethylamine hydrochloride to obtain on recrystallization from isopropanol 4-(2-dimethylaminoethoxy)-5'-phenyl-m-terphenyl hydrochloride which contains some isopropanol of crystallization and gives a clear melt at 169° C.

EXAMPLE 23

4-(2-Piperidinoethoxy)-5'-phenyl-m-terphenyl hydrochloride

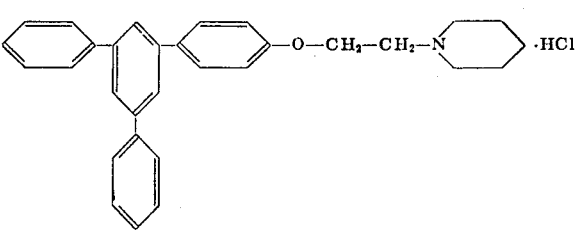

Following the procedure of example 21, and employing equivalent amounts, 5'-phenyl-m-terphenyl-4-ol is reacted with N-β-chloroethylpiperidine to obtain on crystallization from isopropanol light yellow crystals of 4-(2-piperidinoethoxy)-5'-phenyl-m-terphenyl hydrochloride, m.p. 205°–208° C.

EXAMPLE 24

4-(2-Pyrrolidinoethoxy)-5'-phenyl-m-terphenyl hydrochloride

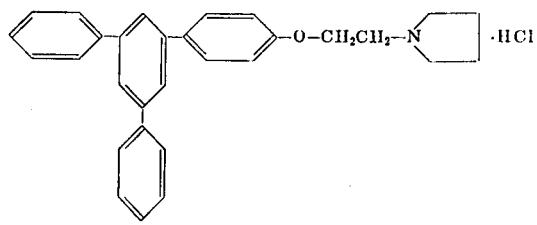

Following the procedure of example 21, and employing equivalent amounts, 5'-phenyl-m-terphenyl-4-ol is reacted with N-β-chloroethyl pyrrolidine to obtain on crystallization from isopropanol white crystals of 4-(2-pyrrolidinoethoxy)-5'-phenyl-m-terphenyl hydrochloride, m.p. 163.5°–166° C.

EXAMPLE 25

Following the procedures basically outlined in examples 13–17, inclusive, and employing the appropriate corresponding starting materials in approximately equivalent amounts, the following compounds of the invention are prepared:

A. 4-diethylaminoethoxy-5'-(2,6-xylyl)-m-terphenyl hydrochloride, m.p. 172.5°–173.5° C. (Crystallization from isopropanol/diethyl ether)

B. 2'',6''-dichloro-4-diethylaminoethoxy-5'-(o-tolyl)-m-terphenyl hydrochloride, m.p. 146.5°–147.5° C. (Crystallization from isopropanol/diethyl ether)

C. 4-diethylaminoethoxy-2-methyl-5'-phenyl-m-terphenyl hydrochloride, m.p. 177.5°–178.5° C. (Crystallization from isopropanol/diethyl ether)

EXAMPLE 26

4-(1,1-Dimethyl-2-diethylaminoethoxy)-5'-phenyl-m-terphenyl hydrochloride.

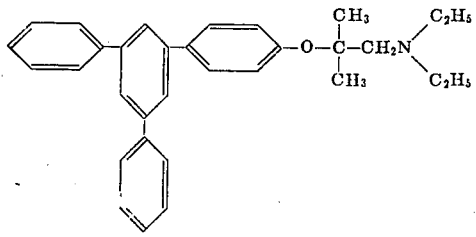

Step A: Preparation of 2-methyl-2-(5'-phenyl-m-terphenyl-4-yloxy) propionic acid ethyl ester.

4.8 g. of sodium hydride, (50 percent) is suspended in 200 ml. of dry dimethylacetamide (DMA), 32.2 g. of 5'-phenyl-m-terphenyl-4-ol (prepared as in example 20) are added portionwise and the mixture stirred at room temperature until all the sodium hydride has reacted. To the resulting mixture 20 g. of ethyl bromoisobutyrate are added and the mixture heated to 100° C. on a water bath for 24 hours. The solvent is then evaporated in a vacuum, the residue taken up in ether and subsequently extracted consecutively with 200 ml. of water, 200 ml. of 1N hydrochloric acid, 200 ml. of water and 200 ml. of a saturated sodium bicarbonate solution. After drying over magnesium sulfate, the ether is evaporated to yield 2-methyl-2-(5'-phenyl-m-terphenyl-4-yloxy) propionic acid ethyl ester.

Step B: Preparation of 2-methyl-2-(5'-phenyl-m-terphenyl-4-yloxy) propionic acid.

9 g. of 2-methyl-2-(5'-phenyl-m-terphenyl-4-yloxy)propionic acid ethyl ester are dissolved in a solution of 2.0 g. of potassium hydroxide in 40 ml. methanol and left at room temperature for 3 days. The solvent is then evaporated in vacuo, the residue dissolved in water, extracted twice with 50 ml. ether and acidified with 20 ml. 2N hydrochloric acid. The product is extracted with 3×50 ml. of diethylether, the organic phase washed with 50 ml. of a saturated sodium chloride solution and then dried over magnesium sulfate. The organic phase is then evaporated off, the residue dissolved ethanol and crystallized therefrom by adding water to obtain 2-methyl-2-(5'-phenyl-m-terphenyl-4-yloxy)propionic acid, m.p. 155°–155.5° C. (This product may also be obtained by reacting the m-terphenyl-4-ol used as starting material in step A with acetone and chloroform in the presence of sodium hydroxide by procedures described in the literature.) Step C: Preparation of N,N-diethyl-2-methyl-e2-(5'-phenyl-m-terphenyl-4-yloxy)propionamide A solution of 24.3 g. of 2-methyl-2-(5'-phenyl-m-terphenyl-4-yloxy)propionic acid dissolved in 100 ml. of thionyl chloride is refluxed for 3 hours, the resulting solution distilled to remove excess thionyl chloride and the residue dissolved in 200 ml. of benzene followed by distillation again to remove residual thionyl chloride. The residue in the amount of 13.6 g. is dissolved in 40 ml. of acetone and to this solution is added dropwise at room temperature a solution of 80 ml. of diethylamine in 20 ml. of acetone. The resulting solution is stirred overnight and concentrated in vacuo to obtain an oil of N,N-diethyl-2-methyl-2-(5'-phenyl-m-terphenyl-4-yloxy)propionamide. propionamide.

Step D: Preparation of 4-(1,1-dimethyl-2-diethylaminoethoxy)-5'-phenyl-m-terphenyl hydrochloride.

A solution of 17.8 g. of N,N-diethyl-2-methyl-2-(5'-phenyl-m-terphenyl-4-yloxy)propionamide in 75 ml. of dry diethyl ether is added dropwise at 0°–5° C. to a slurry of 2.28 g. of lithium aluminum hydride in 125 ml. of dry diethyl ether. The resulting mixture is refluxed overnight and excess reducing agent destroyed by adding ethyl acetate and water. The resulting mixture is dried, filtered, washed with fresh dry ether and the ethereal solution concentrated in vacuo to obtain an oil which is dissolved in 150 ml. of fresh dry ether and then treated with hydrogen chloride saturated diethyl ether. The resulting solid is triturated with dry ether, dissolved in refluxing isopropanol and this solution cooled to room temperature to crystallize 4-(1,1-dimethyl-2-diethylaminoethoxy)-5'-phenyl-m-terphenyl hydrochloride, m.p. 193.5°–194.5° C.

The following compounds are illustrative of additional intermediates of general formula II which are readily prepared for use in accordance with the invention.

A. 1-[4-(2-diethylaminoethyoxy)phenyl]-3,5-diphenyl-cyclohexane-1-ol hydrochloride. (as a viscous oil).

B. 1-[4-(2-diethylaminoethoxy)phenyl]-3,5-diphenyl-1-cyclohexene hydrochloride, m.p. 143°–147° C.

C. 1-[4-(1,1-dimethyl-2-dimethylaminoethoxy)phenyl]-3,5-diphenyl-1-cyclohexene hydrochloride, m.p. 164°–167° C.

D. 1-[4-(1,1-dimethyl-2-dimethylaminoethoxy)phenyl]-3,5-diphenyl-2-cyclohexene-1-ol. (as a bright yellow viscous oil).

What is claimed is:

1. A compound from the group of: A. compounds of the formula:

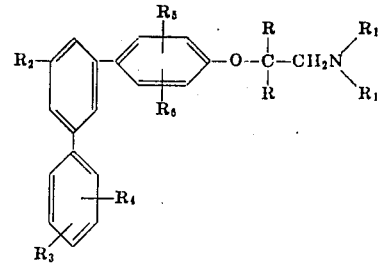

wherein each of R is, independently, hydrogen or lower alkyl;
each of $R_1$ is, independently, lower alkyl, or both $R_1$ together an alkylene bridge of four carbon atoms;
$R_2$ is hydrogen 3-pyridyl, phenyl or substituted phenyl of the formula:

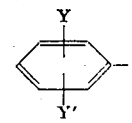

each of Y, Y', $R_3$ and $R_4$ is, independently, hydrogen, halo of atomic weight not exceeding 80, lower alkyl, lower alkoxy, or phenyl, provided $R_3$ and $R_4$ are hydrogen when $R_2$ is hydrogen and provided $R_3$, $R_4$, Y and Y' together represent no more than one phenyl and providing that $R_3$, $R_4$, Y and Y' together represent no more than a total of two alkyl and alkoxy substituents, and each of $R_5$ and $R_6$ is, independently, hydrogen or lower alkyl;

B. N-oxides of said compounds; and
C. the pharmaceutically acceptable acid addition salts of (A) and (B), above.

2. A compound from the group of: (A) compounds of the formula:

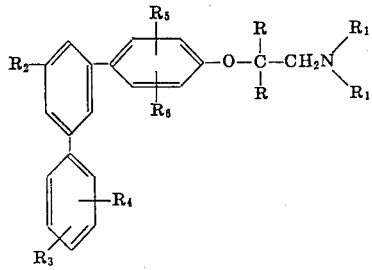

wherein each of R is, independently, hydrogen or lower alkyl;

each of $R_1$ is, independently, lower alkyl, or both $R_1$ together an alkylene bridge of four carbon atoms;

$R_2$ is hydrogen, 3-pyridyl, phenyl, or substituted phenyl of the formula:

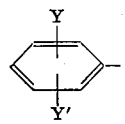

each of
Y, Y', $R_3$ and $R_4$ is, independently, hydrogen, halo of atomic weight not exceeding 80, lower alkyl, lower alkoxy, or phenyl, provided $R_3$ and $R_4$ are hydrogen when $R_2$ is hydrogen and provided $R_3$, $R_4$, Y and Y' together represent no more than one phenyl and providing that $R_3$, $R_4$,
Y and Y' together represent no more than a total of two alkyl and alkoxy substituents, and each of $R_5$ and $R_6$ is, independently, hydrogen or lower alkyl; and B. the pharmaceutically acceptable acid addition salts of (A), above.

3. A compound of claim 2 in which $R_2$ is phenyl.
4. A compound of claim 3 in which $R_1$ is lower alkyl of one or two carbon atoms.
5. A compound of claim 4 which is 4-(2-diethylaminoethoxy)-5'-phenyl-m-terphenyl hydrochloride.
6. A compound of claim 4 which is 4-(2-diethylaminoethoxy)-4''-methyl-5'-phenyl-m-terphenyl hydrochloride.
7. A compound of claim 4 which is 4-5'-phenyl-1,1':3',1'':4'':1α''-quaterphenyl hydrochloride.
8. A compound of claim 4 which is 4-(2-diethylaminoethoxy)5'-(p-chlorophenyl)-m-terphenyl hydrochloride.
9. A compound of claim 4 which is 4-(2-diethylaminoethoxy)-5'-(p-methoxyphenyl)-m-terphenyl hydrochloride.
10. A compound of claim 4 which is 4-(2-diethylaminoethoxy)-5'-(o-tolyl)-m-terphenyl hydrochloride.
11. A compound of claim 3 in which $R_1$ is an alkylene bridge of four carbon atoms.
12. A compound of claim 11 which is 4-(2-piperidinoethoxy)-5'-phenyl-m-terphenyl hydrochloride.
13. A compound of claim 2 in which both R's are lower alkyl.
14. A compound of claim 13 in which $R_2$ is phenyl.
15. A compound of claim 14 which is 4-(1,1-dimethyl-2-dimethylaminoethoxy)-5'-phenyl-m-terphenyl hydrochloride.
16. A compound of claim 1 in which is an N-oxide.
17. A compound of claim 16 which is 4-(2-dimethylaminoethoxy)-5'-phenyl-m-terphenyl N-oxide hydrochloride.
18. A compound of claim 2 which is 4-(2-dimethylaminoethoxy)-5'-phenyl-m-terphenyl hydrochloride.
19. A compound of claim 2 which is 4-[2-(diethylamino)ethoxy]-m-terphenyl hydrochloride.
20. A compound of claim 2 which is 3-[4-(2-diethylamino)ethoxy]-m-terphenyl-5'-yl pyridine hydrochloride.

* * * * *

UNITED STATES PATENT OFFICE
CERTIFICATE OF CORRECTION

Patent No. 3,622,588      Dated November 23, 1971

Inventor(s) Rudolf G. Griot

It is certified that error appears in the above-identified patent and that said Letters Patent are hereby corrected as shown below:

The title of the patent should be changed to read

-- CERTAIN SUBSTITUTED TERPHENYL-OXYALKYL AMINES AND DERIVATIVES THEREOF --.

Column 30 claim 7 should be changed to read

-- A compound of claim 4 which is 4-[2-(diethylamino)ethoxy] - 5'-phenyl-1,1':3',1":4":1'" - quaterphenyl hydrochloride.--.

Signed and sealed this 16th day of April 1974.

(SEAL)
Attest:

EDWARD M. FLETCHER, JR.
Attesting Officer

C. MARSHALL DANN
Commissioner of Patents